United States Patent [19]

Moore et al.

[11] 4,154,750

[45] May 15, 1979

[54] ACTIVATED CARBON IMPROVED VEGETABLE OIL REFINING PROCESS

[75] Inventors: Hal E. Moore, Darien, Ill.; James B. Yeates, Lincoln, Nebr.

[73] Assignee: Calgon Corporation, Pittsburgh, Pa.

[21] Appl. No.: 908,175

[22] Filed: May 22, 1978

Related U.S. Application Data

[63] Continuation of Ser. No. 769,818, Feb. 17, 1977, abandoned.

[51] Int. Cl.[2] .......................... C11B 3/04; C09F 5/10

[52] U.S. Cl. .................................. 260/424; 260/428; 260/428.5

[58] Field of Search ..................... 260/424, 428, 428.5

[56] References Cited

U.S. PATENT DOCUMENTS

| | | | |
|---|---|---|---|
| 2,980,717 | 4/1961 | Raffaeta | 260/428 |
| 3,354,188 | 11/1967 | Bock | 260/424 |
| 3,455,975 | 7/1969 | Martinenghi | 260/428 |
| 3,895,042 | 7/1975 | Taylor | 260/428 |

*Primary Examiner*—John Niebling

*Attorney, Agent, or Firm*—Raymond M. Speer; Edmunde D. Riedl

[57] ABSTRACT

Phospholipid-containing vegetable oils, especially soya oil, are treated by an improved refining method comprising the steps of degumming the crude vegatable oil, passing the degummed oil through a bed of granular activated carbon, and finally subjecting the treated vegetable oil to steam assisted vacuum distillation deodorization. The process yields a final product acceptable in taste, odor and color and storage stable for normal shelf life periods.

5 Claims, 4 Drawing Figures

CRUDE SOYBEAN OIL
WATER
WATER FLOW CONTROLLER
OIL WATER FLOW CONTROLLER
MIXER
CENTRIFUGAL SEPARATOR
PRESSURE CONTROLLER
WET GUMS
PARTIALLY DEGUMMED SOYBEAN OIL

PARTIALLY DEGUMMED SOYBEAN OIL
HEATER
ACID
MIXER
PHOSPHORIC ACID
MIXER
BACK PRESSURE VALVES
CENTRIFUGE
PUMP EQUALIZER
WATER
HEATER
CENTRIFUGE

ACTIVATED CARBON IMPROVED VEGETABLE OIL REFINING PROCESS

This is a continuation, of application Ser. No. 769,818 filed Feb. 17, 1977 now abandoned.

BACKGROUND OF THE INVENTION

The present invention is concerned with an improved process for refining phospholipid-containing vegetable oils which employs treatment with activated carbon during the preliminary stages.

More particularly, the present invention is concerned with an improved refining process for edible phospholipid-containing vegetable oils, especially soya oil, which comprises the steps of degumming the crude vegetable oil, passing the degummed oil through a bed of activated carbon, and finally subjecting the treated vegetable oil to vacuum steam stripping and deodorization.

The vegetable oils to which the present invention is applicable are those having a phospholipid level of 0.05% by weight and above. Phospholipids, or phosphatides, are lipoid substances that occur in cellular structures and contain esters of phosphoric acid. The aminophosphatides, or lecithins, which are mixed esters of glycerol and choline with fatty acids and phosphoric acid, are especially common. For example, the phospholipid content of crude soybean oil ranges from 1.1 to 3.2% by weight, and averages 1.8%, while the phospholipid content of peanut oil ranges from 0.3 to 0.4% by weight.

Thus, the improved refining process of the present invention is applicable to such edible vegetable oils as soya or soybean oil, corn oil, cottonseed oil, peanut oil, sesame seed oil and rapeseed oil, among others. On the other hand, the refining process of the present invention is not applicable to such oils as olive oil, palm oil, palm kernel oil, coconut oil, and babassu oil, among others.

The process of the present invention has proven especially suitable to refining of soybean oil, and it is, therefore, particularly applicable thereto. Soybean oil is, moreover, the most important vegetable oil produced in the United States, comprising about 82% of the present total annual vegetable oil production.. Thus, production of soybean oil in the United States is an important and extensive industry, with current annual production of edible soya oil being approximately 9.5 billion pounds. While crude soybean oil is stable and nonreverting in nature, it has a dark color and a strong odor and taste which make it regarded as unpalatable in that state. Consequently, a number of techniques have been employed previously in the art to refine the crude soybean oil. The resulting product, while initially a light colored oil with a bland and agreeable flavor, in many cases unfortunately reverts by stages to more unpleasantly flavored forms after standing for a short period of time.

Figures 1, 2:
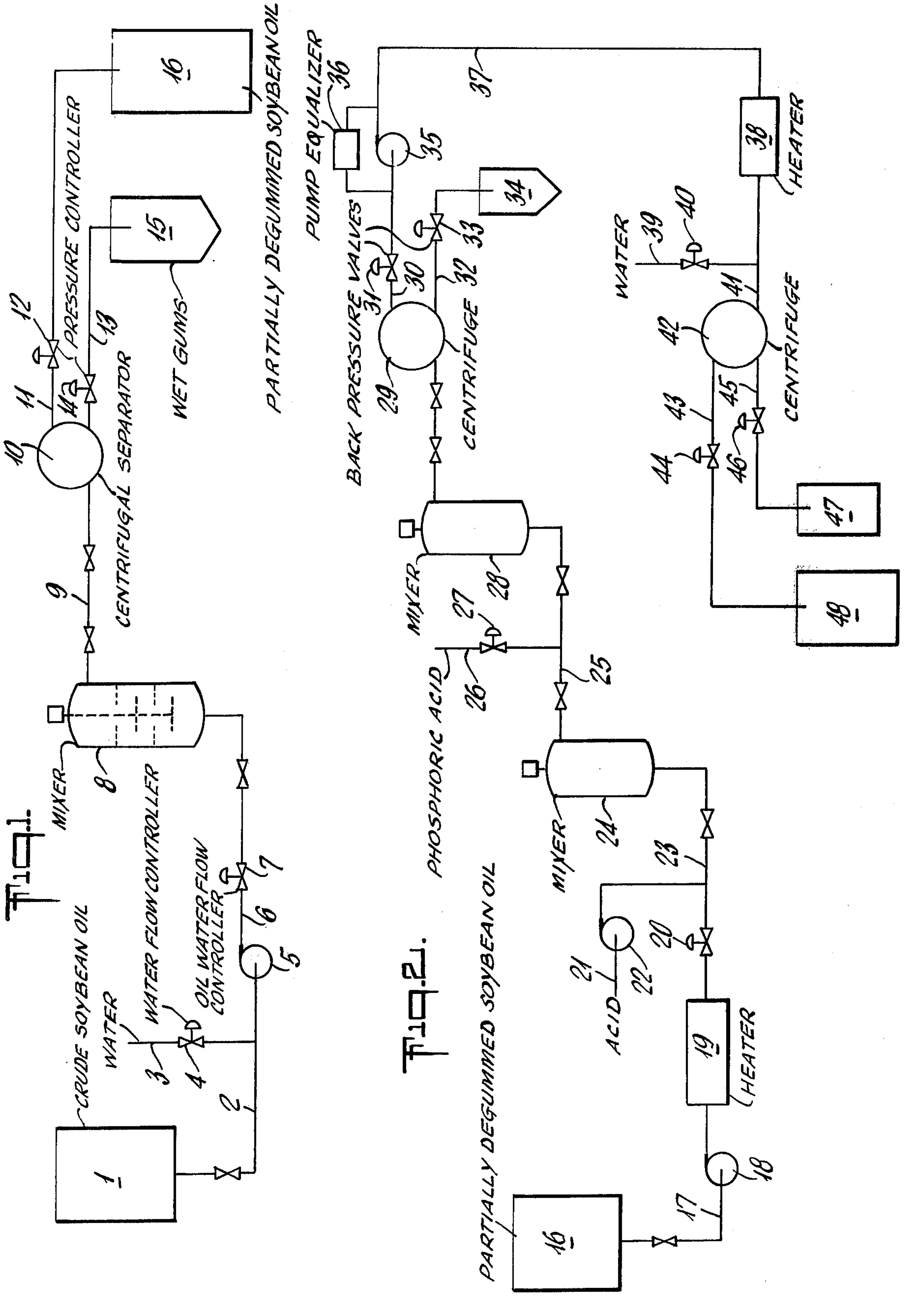
FIG. 1 is a diagrammatic and schematic representation of equipment suitable for carrying out the degumming step of the process of the present invention, where degumming is carried out using water alone.
FIG. 2 is a diagrammatic and schematic representation of equipment suitable for carrying out the degumming step of the process of the present invention, where degumming is carried out using acid and water.

In accordance with the improved refining process of the present invention, it is possible to eliminate two conventional refining steps which are cumbersome and wasteful, and yet at the same to obtain an end product refined oil having a phosphorus concentration below 2.0 parts per million (p.p.m.), an iron and copper concentration below 1.0 and 0.05 p.p.m., respectively, and a peroxides concentration level of less than 2.0 meq. per 1.0 kg. of oil. As a result, the end product refined oil is acceptable with respect to prevailing industry standards for taste, odor, and color, and is, moreover, storage stable over the normal shelf life period of from one to three or more months. The end product refined oil produced in accordance with the present invention is thus comparable to oils produced by conventional refining processes in these respects.

Conventional processes heretofore employed for refining vegetable oils, particularly soybean oil, have employed a number of distinct treatment steps. However, most often these have consisted of degumming, alkali neutralization, water washing, bleaching, and deodorizing, employed in that order. See, for example, U.S. Pat. No. 3,629,307.

1. The step of degumming removes various mucilaqinous products, primarily protein or albuminoid substances and phospholipids, from the crude vegetable oil. These phospholipids, primarily lecithin, cephalin and inositol phosphatide, are primarily responsible for the rather strong and bitter flavor and aroma of the crude oil. They are responsible, moreover, for fouling of processing equipment employed in subsequent refining operations, if they are not successfully removed. The degumming process is primarily carried out at the extraction mill, where alkali refining may or may not be carried out. To a much lesser extent, degumming may be done by the refiner at another location. In general, the degumming process consists of adequately mixing with the crude vegetable oil, an organic acid such as phosphoric acid or acetic acid, followed by a little water. The resulting hydrated, mucilaginous globules are subsequently removed from the oil by centrifuging. The step of degumming may also be carried out without the use of acid, by simply adding water. Both types of degumming will be described in more detail hereinafter. While substantially all of the phospholipids should be removed, to a level at least below 2.0 p.p.m., as phosphorus, it has not been considered possible to accomplish such a result by conventional water degumming alone. Unless substantially all of the phospholipids are thus removed, a dark colored oil will be produced by decomposition of the remaining phospholipids at the elevated temperatures encountered during the final step of vacuum steam stripping and deodorizing. This dark colored material is very difficult to remove by ordinary refining or bleaching and imparts an off-flavor to the refined vegetable oil final product. In addition, the phospholipids tend to chelate any metal ions contained in the vegetable oil being refined, and will tend to carry these over into the refined oil final product, where they can cause undesired oxidation of the refined vegetable oil final product. Moreover, the phospholipids recovered, particularly lecithin, continue to possess good market value as a by-product for sale in non-related fields, for use, for example, as an emulsifying agent.

Various methods of degumming have been employed in the past, including the use of various aliphatic and aromatic hydrocarbon and other compositions which are solvents for the vegetable oil, but nonsolvents for the phospholipids and other mucilaginous products. Acetone is an example of a suitable solvent. As the solvent is added to the vegetable oil, the decreased solubility of the phospholipids and other impurities causes them to precipitate out of the oil. Separation can then be achieved simply by filtration. The separated oil is then treated to remove the added solvent, for example, by distilling under a moderate vacuum. See, for example, U.S. Pat. No. 2,117,776. However, such methods have the serious drawback of requiring the use of often hazardous solvents.

The preferred method of degumming for use in the improved refining process of the present invention is one whereby the phosphollipids and other mucilaginous products are simply hydrated, precipitated, and separated, desirably by a continuous process. As before stated, an acid such as 85% phosphoric acid is also used before the addition of the water. The amounts used may vary from 300 to 2,000 p.p.m. by volume of oil. The amount of water may be from 1.0 to 3.0% by volume. The temperature may be from 100° to 160° F. The refining process of the present invention may employ either (1) the simple degumming method using water alone, (2) the acid degumming method using water and acid together, or (3) a combination or sequence of the degumming methods (1) and (2). The mixture is introduced into a continuous centrifuge in which it is heated and caused to circulate continuously, whereby the mucilaginous products are completely hydrated and the aqueous phase containing these hydrated mucilaginous products is finally discharged. See U.S. Pat. No. 3,206,487.

2. The second step in the conventional oil refining process is alkali neutralization of the oil to remove free fatty acids and other impurities. Usually, this neutralization is accomplished simply by treating the oil with an aqueous solution of sodium hydroxide or other strongly alkaline reagent. The free fatty acids in the oil, generally present in amounts of from 0.5 to 3.0% by weight, are removed as precipitated soaps produced by the reaction of the fatty acids and alkaline reagent. The soap thus formed may be removed by centrifuging and the separated soapstock disposed of in some manner. However, handling of these soapstocks has presented considerable problems to the vegetable oil refiner. Usually, these soapstocks are acidulated and free fatty acids are recovered. Nevertheless, waste-products are produced which cannot be readily disposed of without creating problems of environmental pollution. As a final step, the oil is then washed with water to remove virtually all traces of soap, and the oil is then dryed to remove any dissolved or emulsified water which may be present.

3. The third step in the conventional vegetable oil refining process is bleaching to remove pigments remaining in the oil after the previous refining steps. Such pigments comprise the carotenoids and chlorophyll, among others. Typically, the bleaching step is carried out under vacuum at a moderate temperature in the range of 210° to 250° F., and in the presence of an activated earth such as fuller's earth, perhaps admixed with a lesser amount of activated carbon. After the bleaching has been carried out, it is necessary to filter out the bleaching earth and activated carbon and pigment products adsorbed thereon. It has been found that during bleaching some free fatty acid products are generated and that the acid value of the oil is raised to about double that existing at the end of the alkali neutralization process.

4. The fourth step in the conventional refining of vegetable oils is deodorizing. During this step live steam is passed through the vegetable oil while it is maintained under a high vacuum and at elevated temperatures. The temperature usually ranges from 460° to 530° F. and the vacuum is maintained at 4 to 6 mm. Hg. The process may require from one and onehalf to seven hours. During the process most of the free fatty acids remaining in the vegetable oil are distilled off. Most of the remaining pigment products are destroyed during this step as well. The acid value and color of the oil are thus improved, and the odor and flavor are made acceptable. However, if any appreciable quantity of phospholipids remains, the elevated temperatures experienced during this step would result in a darkening of the oil. For most vegetable oils it has been considered necessary to utilize both alkali neutralization as well as deodorization in order to remove most of the free fatty acid content of the vegetable oil, as well as to get a bland-tasting and odorfree edible oil.

The conventional deodorizing step has been improved by variation of the parameters involved and other modifications. See, for example, U.S. Pat. No. 3,506,696.

Figure 4:
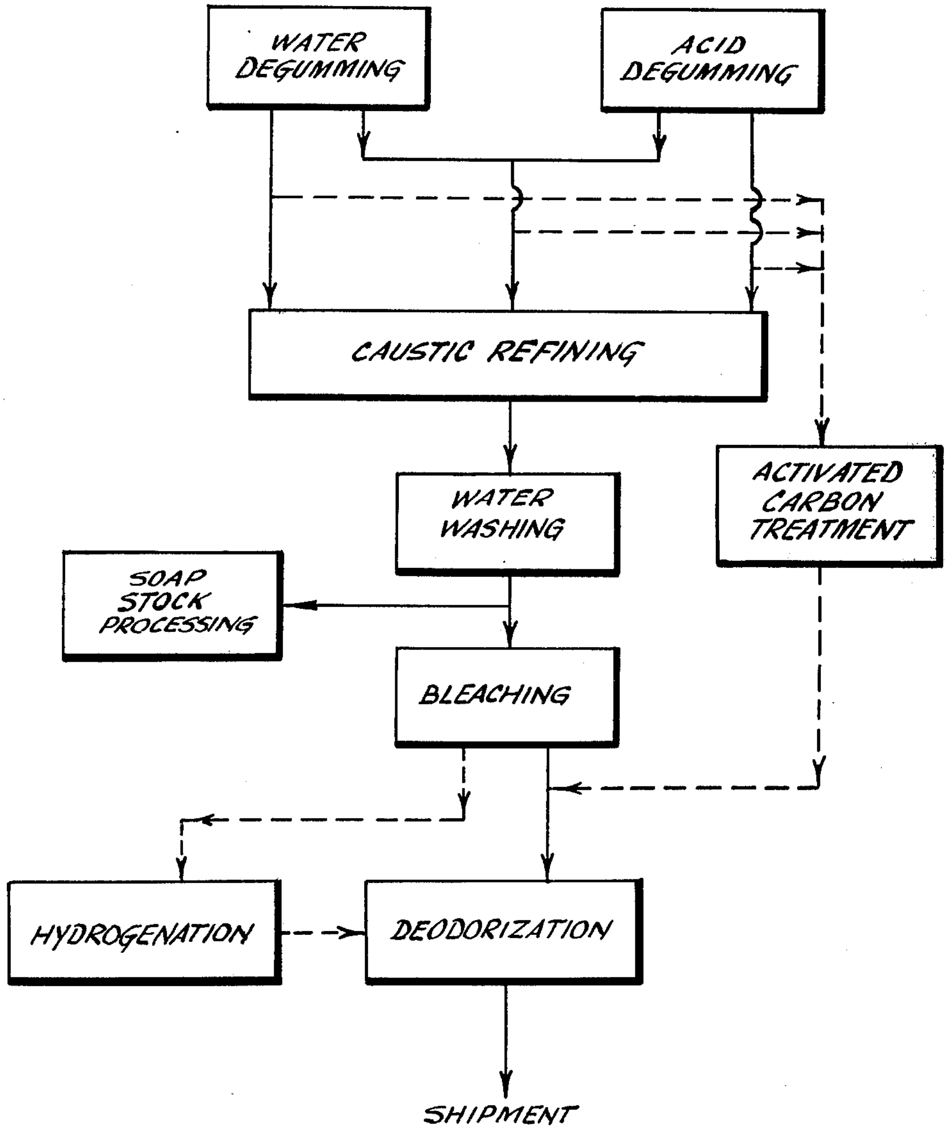
FIG. 4 is a flow sheet differentiating between the process of the prior art set forth in solid lines and the improved process of this invention set forth in dashed lines.

The vegetable oil refining method of the present invention is an improvement over the conventional refining process described in the paragraphs above since it eliminates both the conventional alkali neutralization and water washing step and the conventional bleaching step. This conventional process step elimination is possible because the carbon treatment of the present invention reduces the phospholipid concentration of the degummed oil sufficiently to result in a final product which is both stable and acceptable from the standpoint of taste, color and odor. In addition, the final product is satisfactory as a consequence of the removal of other impurities in the oil, especially peroxide compounds, by the activated carbon treatment step. Thus, the step elimination improvement may be illustrated by reference to the flow sheet set forth in FIG. 4.

In addition to the conventional refining process described above, other, often more direct, methods have been put forward in the art as improved methods of vegetable oil refining. For example, U.S. Pat. No. 2,746,867 describes a two step refining process comprising a first step of carefully controlled partial degumming by means of hydration, followed by steam deodorizing at a moderate temperature. However, this process is intended to leave at least some of the free fatty acids in the product. Similarly, U.S. Pat. No. 2,117,776 describes a two step process comprising removal of the phospholipids from the crude oil, preferably by precipitation with a non-solvent, followed by high vacuum-short path distillation of the oil.

As already noted above, it is known to employ activated carbon conventionally as a bleaching agent, that is, as a decolorizing agent to remove various pigment products. When employed as a bleaching agent, the activated carbon is typically utilized in powder form in a batch or continuous batch-type operation. Conventionally, such use takes place before the vaccum distillation deodorization step. Nevertheless, the art has preferred to employ activated clays as bleaching agents rather than activated carbons due to their greater cost effectiveness, a result of the much greater holding capacity of the activated carbons for the vegetable oil, is compared to the activated clays.

However, it is known to employ activated carbons in various ways in vegetable oil refining processes. For example, John P. Harris and Bernard N. Glick, in "Crude Cotton Oil Filtration," *Oil & Fat Industries,* pp. 263–265, Sept., 1928, suggest activated carbon filtration of crude cotton oil to remove certain colloids and other impurities prior to the conventional refining process. U.S. Pat. No. 3,455,975, concerned with a refining process wherein deacidification and deodorization of glyceride oils is accomplished by distillation in a steam current under vacuum, also discloses decolorization pretreatment with artificially activated montmorillonite earth and activated carbon. However, the pretreatment is applied to olive oil, and where maize germ oil is treated, it is described as being prerefined until reaching a yellow color. U.S. Pat. No. 3,354,188 describes a refining method comprising the steps of dispersing an acid refining agent in the vegetable oil to form an emulsion, adsorbing the dispersed refining agent phase on a particulate solid such as fuller's earth, activated clay, or charcoal, and separating the continuous oil phase which is then subjected to steam distillation. U.S. Pat. No. 2,980,717 describes a refining method comprising the steps of mixing the crude oil stock with a bleaching adsorbent, for example a mixture of decolorizing earth and activated carbon, and subjecting the mixture to a sudden rise in temperature by bringing the mixture, while falling in a subdivided state, into contact with a separate hot mixture of crude oil stock and bleaching adsorbent, the contact taking place at sub-atmospheric pressure and elevated temperatures and in the presence of a countercurrent stream of superheated steam.

In contrast to methods heretofore employed in the art, the method of the present invention uniquely provides for a straightforward and efficient means of preparing refined vegetable oils having a final phospholipid level of less than 5.0 p.p.m., measured as phosphorus especially less than 2.0 p.p.m., measured as phosphorus, a peroxides concentration level of less than 2.0 meq. per 1.0 kg. of oil, and having reduced contents of other impurities which would result in an unstable product and one unacceptable in color, taste and odor.

SUMMARY OF THE INVENTION

In accordance with the method of the present invention, crude edible vegetable oils having a phospholipid content of 0.05% by weight and above are refined by the successive steps of degumming, passing of the degummed oil through a bed of activated carbon, and subjecting of the thus treated vegetable oil to vacuum steam distillation and deodorization. An edible vegetable oil refined by this process will have a final peroxides concentration level of less than 2.0 meq. per 1.0 kg. of oil, and a final phospholipid content of less than 5.0 p.p.m., measured as phosphorus and particularly less than 2.0 p.p.m., measured as phosphorus. A phosphorus level below 2.0 p.p.m. has been found especially desirable for refined vegetable oils which are to be hydrogenated, which is the case for a substantial majority of all refined oils. However, for non-hydrogenated oils the phosphorus level should not be more than 5.0 p.p.m.

For purposes of the present invention, the phosphorus level of the refined vegetable oil final product is measured in accordance with the procedure specified in A.O.C.S. Official Method Ca 12–15 "Phosphorus," *Sampling and Analysis of Commercial Fats and Oils,* modified as suggested in C. D. Evans et al., "Iron and Phosphorus Contents of Soybean Oil . . . ," *J. of the American Oil Chemists' Society, Vol.* 51, No. 10, pp. 444–448 (1974). This method determines phosphorus or the equivalent phosphatides content by asking the sample in the presence of zinc oxide followed by colorimetric measurement of phosphorus as molybdenum blue. The modification of C. D. Evans et al. provides for hydrolyzing of the magnesium pyrophosphates by gentle boiling in sulfuric acid solution before proceeding with the phosphorus color determination.

The peroxide value of the refined vegetable oil final product, for purposes of the present invention, is measured in accordance with the procedures specified in A.O.C.S. Official Method Cd 8–53 "Peroxide Value," *Sampling and Analysis of Commercial Fats and Oils.* This method determines all substances, in terms of milliequivalents of peroxide per 1000 grams of sample, which oxidize potassium oxide under the conditions of the test.

The degumming step of the method of the present invention may be carried out using any conventional procedure for removing various mucilaginous products, primarily protein or albuminoid substances and phospholipids, from the crude vegetable oil. Typically, the degumming step will reduce the phopholipid content of the vegetable oil to about 200 to 250 p.p.m., measured as phosphorus. However, it has been possible to obtain phospholipid levels in this degumming step for the present invention in the range of from about 50 to about 100 p.p.m. of phospholipids, and even lower, measured as phosphorous.

The preferred method of degumming the crude vegetable oil in accordance with the method of the present invention is by simple hydration of the mucilaginous product impurities contained in the vegetable oil. The hydrated mucilaginous products form a precipitate which can be separated. The amount of water employed ranges from about 1 to about 2% by weight, based on weight of crude vegetable oil to be treated. In has been found that certain agents improve the rate and amount of mucilaginous product precipitation. For example, certain acids, such as acetic acid and phosphoric acid, have been found to improve the efficiency of the degumming step. These precipitation enhancing agents are most easily employed by simply adding them before the water employed for hydration of the crude vegetable oil mucilaginous products (gums).

The degumming step may be carried out at normal temperatures and pressures. However, it is preferred to carry out the step at a temperature of from about 100° to about 160° F.

While separation of the precipitated, hydrated mucilaginous products may be accomplished simply by filtration, the rate and efficiency of separation is greatly improved by the use of equipment which permits continuous centrifuging of the hydrated crude vegetable oil gums. Indeed, it is preferred to employ equipment which will provide for high speed mixing and agitation of the acid, water and vegetable oil mixture, with subsequent centrifugal separation. Thus, pumps or other devices may be utilized to form an initimate physical mixture or emulsion of the water and oil, whereby the area of surface contact between the water and mucilaginous products in the oil is substantially increased. Then, centrifugal separators remove the water and hydrated mucilaginous products to yield demucilaginated oil. In association with such centrifugal separators there may also be employed static separators which permit gravimetric classification of the emulsion of vegetable oil and water.

Desirably, the various types of equipment described above will be utilized in such a way that they operate to provide continuous processing of the vegetable oil. Also, multiple cycling of the oil and water can improve the performance results of the process.

Alternatively, the degumming step may be carried out using steam to replace the water for hydration of the mucilaginous products in the vegetable oil. The emulsion formed is then separated by centrifuging in the same manner as for the emulsion formed with water in the conventional process.

Subsequent to the degumming step, there may be employed, desirably, a step of water washing of the degummed vegetable oil, for the purpose of removing additional amounts of precipitated mucilaginous products and any contaminants that may have been introduced into the vegetable oil during the degumming step.

The step of activated carbon treatment comprises contacting the previously degummed or demucilaginated vegetable oil with granular activated carbon by passing the oil through a bed of granular activated carbon. The use of granular activated carbon in a bed to treat vegetable oil is a basic departure from the conventional use of activated carbons as bleaching agents, where they are normally employed in powder form and in batch or continuous batch-type operations, which is a less complicated manner of utilizing activated carbon than the bed system. However, as has already been pointed out, the activated carbon treatment step of the present invention has an entirely different objective, and achieves an entirely different result, from the bleaching treatment step in which activated carbons have been utilized in the past.

By using a bed of granular activated carbon, it is possible to achieve an acceptably small effective dosage of carbon for a given quantity of oil to be treated, by reason of the possibility of regeneration of the granular activated carbon, and also by reason of the significantly lower effective equilibrium concentration adsorption levels which exist in a bed of granular activated carbon as compared to powdered activated carbon used in a batch-type operation. Thus, phospholipids could not be removed from degummed vegetable oils to the extent achieved by the activated carbon treatment step of the present invention by use of powdered activated carbon in the amounts normally employed in conventional batch-type bleaching operations.

The granular activated carbon which may be employed in the activated carbon treatment step of the present invention should fall within the mesh size range of 12×40, U.S. Sieve Series. However, the size of the activated carbon granules is not especially critical, so long as it does not vary considerably from the indicated range. The activated carbon material itself should be a conventional liquid phase activated carbon prepared from any suitable source, including petroleum, coal, wood and other vegetable raw materials. Coal based activated carbons have been found especially suitable. A preferred granular activated carbon material for use in the present invention is CAL 12×40, available from the Pittsburgh Activated Carbon Division of Calgon Corporation.

The size of the column vessels used to establish the bed of granular activated carbon may be varied in size, depending, essentially, on the volume of vegetable oil to be processed.

The total contact time of granular activated carbon with the vegetable oil being treated may be from about 4 to about 24 hours, and preferably will be from about 6 to about 12 hours.

A preferred manner of employing the bed of granular activated carbon in the process of the present invention is the pulse-bed system. This system duplicates the action of a large number of filters in series in a clean, continuous, closed system. In this system, a small amount of spent activated carbon is removed (slugged) from the bottom of each column once during every eight-hour period. The removed activated carbon is then regenerated for further use. At the same time that the spent activated carbon is removed from the bottom of each column, a corresponding amount of regenerated or virgin activated carbon is added to the top of each column bed from charge tanks located above each column.

The columns themselves are typically cone-bottomed columns ten feet in diameter and thirty feet in height, capable of holding approximately 2700 cubic feet of granular activated carbon. A number of such columns would be required to process the normal output of a sizeable vegetable oil refinery, for example, approximately 60,000 pounds of vegetable oil per hour. Clearly, however, the dimensions of the columns are not especially critical and may be considerably varied to conform to space requirements or other considerations.

The spent carbon which has been removed from each column is carried by gravity to an oil recovery tank where oil is removed from the spent activated carbon by washing with a $C_5$ to $C_8$ aliphatic hydrocarbon solvent, particularly hexane. It has been found that hexane is a uniquely suitable solvent for removal of the vegetable oil trapped in the spent activated carbon since the impurities adsorbed on the activated carbon are not eluted with the solvent. Hexane is also non-toxic, relatively inexpensive, and readily available. Several bed volumes washing with hexane will be sufficient to remove substantially all of the oil trapped in the spent activated carbon. In turn, removal of the hexane solvent from the activated carbon is readily accomplished using steam.

After oil recovery from the spent activated carbon, regeneration is carried out. The spent activated carbon is conveyed away from the site of steam stripping to remove hexane by means of a dewatering screw to remove excess water. The spent activated carbon is carried into a multiple hearth furnace where it is regenerated as it passes through a controlled atmosphere at high temperatures. The regenerated carbon is then ready for reuse in the overall process.

Before the regenerated carbon or virgin activated carbon is placed in the column vessels for use, it usually is necessary to deaerate the activated carbon during a preliminary wetting step. It has been found that air bubbles trapped between the granules of activated carbon interfere in a material way with the efficiency of the activated carbon treatment step. The air bubbles adhere rather tenaciously to the activated carbon granules, but it has been found that they can be satisfactorily removed by agitation of the activated carbon granules together with heated degummed vegetable oil in a preliminary step.

After the step of activated carbon treatment of the degummed vegetable oil, the third step of deodorizing is carried out. The deodorization is accomplished by steam distillation under vacuum in accordance with well known procedures already established in the art. The distillation is generally carried out at temperatures in the range of from about 400° to about 550° F., preferably at temperatures of from about 460° to about 530° F. The distillation is carried out at a reduced pressure of from about 1 to about 10 mm. Hg, preferably at from 4 to 6 mm. Hg.

Vacuum steam distillation deodorization takes advantage of the significant differences in volatility between the basic triglyceride components of the vegetable oil and the various substances which give the oil its natural odor and flavor. Thus, the relatively volatile odor and flavor causing substances in the vegetable oil are stripped from the relatively nonvolatile oil during the process of steam distillation. The function of the steam in the distillation process is the conventional one of serving as a carrier for the odor and flavor causing substances being distilled from the oil. There is ordinarily no intended chemical reaction of the steam with the oil or its components. The steam distillation is usually carried out at high temperatures in order to increase the volatility of the odor causing substances in the oil. Carrying out the steam distillation process at significantly reduced pressure protects the oil from undue hydrolysis by the steam and from atmospheric oxidation. It also greatly reduces the quantity of steam required for the process.

Deodorization by steam distillation also significantly reduces the color of the processed vegetable oil, since the carotenoid pigments responsible for the major portion of the oil color are unstable to heat.

Along with odor, flavor and color causing substances, the steam distillation process also more or less completely removes the free fatty acids in the vegetable oil. The free fatty acid content of the oil can be reduced by the deodorization process to a level in the range of from about 0.015 to 0.03% by weight, which is approximately the same level achieveable by conventional alkali refining. However, since the free fatty acid distillation rate is concentration dependent, and since the distillation process results in splitting of some oil to form additional quantities of free fatty acids, an equilibrium point is reached, resulting in a minimum content of free fatty acid in the oil. Odor and flavor causing substance removal from the vegetable oil generally parallels the free fatty acid removal during the process of distillation deodorization.

Temperature significantly affects the efficiency of the distillation deodorization process since the logarithm of the vapor pressure of a volatile odor or flavor causing substance to be removed is proportional to its absolute temperature. Thus, an even progression in temperature will double and then quadruple the volatility of the odor or flavor causing substance. To achieve a given level of odor and flavor causing substances in a vegetable oil after processing by distillation deodorization, it will require approximately three times as long to deodorize at 350° F. as at 400° F., and nine times as long as at 450° F. Since the amount of steam required in the distillation process is inversely proportional to the vapor pressure of the volatile components being removed from the vegetable oil, higher operating temperatures also result in a reduced requirement for steam in the distillation process.

As already noted, the use of reduced pressure, that is, employing a vacuum distillation process, has a number of important advantages. In addition to these, the affect on the amount of steam required is significant. Since the amount of steam required in the deodorization process is proportional to the absolute pressure, the greatest economy of steam use results from the highest vacuum. The use of higher vacuums also significantly reduces the amount of time required for the deodorization process by increasing the maximum permissible rate of steaming.

Design of equipment utilized in the deodorization process can also be an important factor in improving the efficiency of the process. For example, the use of baffled apparatus permits stripping of the vegetable oil in shallow layers. Splashing of the oil against the baffles results in breaking up of the oil, thus creating a large oil and steam interface. By use of such equipment, the vaporization efficiency increases with the steaming rate.

DETAILED DESCRIPTION OF THE INVENTION

In order to correlate the extent of phosphorus and peroxide composition removal to effective activated carbon dosage, a sample of degummed soya oil was divided into aliquots and treated with varying amounts of activated carbon in accordance with the method of the present invention. The results of this evaluation are illustrated in the following table of values;

| Activated Carbon Concentration (% by wt.) | Phosphorus Level (p.p.m.) | Peroxide Level (mg. per kg. of oil) |
|---|---|---|
| Blank | 71.5 | 5.0 |
| 0.1 | 57.2 | 3.2 |
| 0.2 | 58.0 | 2.2 |
| 0.4 | 56.8 | 1.8 |
| 0.7 | 52.8 | .2 |
| 1.0 | 44.2 | .2 |
| 2.0 | 27.4 | .2 |
| 4.0 | 6.9 | .2 |
| 7.0 | 1.9 | .2 |
| 10.0 | 1.2 | .2 |

As may be seen, the amount, that is, the concentration of activated carbon required to result in a refined vegetable oil final product having a phosphorus level below 5.0 p.p.m. and a peroxide level of less than 2.0 meq. per 1.0 kg. oil, will depend upon the phosphorus level of the vegetable oil after the initial degumming step. The amount of activated carbon required will vary somewhat depending upon the type of vegetable oil being refined, but will correspond generally to the values expressed in the table above.

The activated carbon treatment method of the present invention provides a direct and inexpensive means for reducing the phosphorus level of a refined vegetable oil to desirably low levels. To illustrate this improved result, a sample of soya oil was removed after a degumming step where phosphorus levels varied between 75 and 125 p.p.m., and was subjected to storage for several days. During this period additional degumming took place by simple gravitational precipitation. The phosphorus level was measured and the sample was then subjected to the activated carbon treatment of the present invention, whereafter the phosphorus level was again measured. For comparison, a portion of the same sample of soya oil removed after a degumming step, but without being subjected to storage, was subjected to a caustic refining step and a bleaching step as described herein, whereafter the phosphorus level was measured. As already noted above, caustic refining has been commonly regarded heretofore as the method of choice for removing phospholipids, as well as free fatty acids, from a vegetable oil during the refining process. The following table of values shows that the activated carbon treatment method of the present invention provides an improved process, in terms of operation and result, for removing phospholipids from vegetable oils during the refining process.

| Sample | Phosphorus Level (p.p.m.) | |
|---|---|---|
| | Procedure A* | Procedure B** |
| Degummed | 6.80 | 2.1 |
| Caustic Refined | 6.00 | 1.7 |
| Activated Carbon Refined | 1.20 | 0.2 |

*Procedure A was that specified in A.O.C.S. Official Method Ca 12-55 "Phosphorus", Sampling and Analysis of Commercial Fats and Oils, modified as suggested in C. D. Evans et al., "Iron and Phosphorus Contents of Soybean Oil . . .", J. of the American Oil Chemists'Society, Vol. 51, No. 10, pp. 444–448 (1974).
**Procedure B was that specified by Fiske and Subbarow, J. Biol. Chem., Vol. 66, p. 375 (1925), modified as suggested in C. D. Evans et al. above.

Crude, that is, unrefined vegetable oils naturally contain antioxidant compounds, notably the tocopherols, which enhance their stability. It has generally been considered that a refined vegetable oil final product should contain at least 600 μg. of tocopherols per gram of oil for good stability. Thus, an acceptable refining process will not remove or destroy tocopherols in the vegetable oil being refined to a level below 600 μg./g. of oil. The improved refining process of the present invention meets this important criterion of acceptability. Thus, when a sample of soya oil refined in accordance with the process of the present invention, except for the step of vacuum steam distillation deodorization, was analyzed for its level of tocopherols in accordance with the procedure described by P. A. Sturm in *Analytical Chemistry,* Vol. 38, p. 1244 (1966), it was found that the level was 874 μg. of tocopherols per g. of oil. This level of tocopherols is well above that considered a necessary minimum.

For the purpose of illustrating the refining process of the present invention more fully, reference will now be made in detail to the accompanying drawings which represent in schematic fashion the various stages of the activated carbon treatment step of the present invention.

An appreciation of the various stages of these treatment steps can be gained from the Figures of the drawings when taken together with the detailed description which follows.

EXAMPLE 1

Crude soybean oil as available from an extraction plant is usually processed further at that location, for recovery of lecithin.

In this process, water is the sole degumming agent. Reference should be made to FIG. 1 of the drawings, which illustrates a continuous system. The crude soybean oil from an extraction plant is at a temperature of 125° F. in tank 1. The phosphorus content is 650 p.p.m. which corresponds to a phosphatide content of 1.95%. It then goes into line 2 to pump 3 at a rate of 30,000 pounds per hour. Water is metered from line 3 by the water flow controller 4 at a rate of 1.0% or 300 pounds per hour. The initial mixing of water and oil is done in pump 5. The mixture is pumped at a pressure of 120 PSIG into line 6. Flow control valve 7 is regulated for a flow rate of 30,300 pounds of crude soybean oil and water. The mixture is pumped upward into mixer 8. It is equipped with a 2 H.P. motor drive and two 14 inch diameter three-bladed propellers operating at 180 R.P.M. There are two horizontal baffles for thorough mixing.

The agitated mixture of oil and water than flows into line 9 to centrifuge 10. A De Laval SRG 214 centrifuge operating at a speed of 4,400 R.P.M. is employed. The partially degummed soybean oil flows into line 11 and the back pressure on this oil phase is controlled by back pressure controller 12 and then flows into the storage tank 16. The separated wet gums flow into line 13 and its back pressure is controlled by back pressure controller 14. The wet gums flow into tank 15. The back pressure controllers 12 and 14 are of known type and automatically control the operation of the separator.

The partially degummed oil has a phosphorus content of 200 p.p.m.-which corresponds to 0.6% of phosphatides. The quantity of wet gums is 900 pounds per hour or 3.0% of the oil feed. The analysis of the wet gums is 33% water, 45% phosphatides and 22% soybean oil. The wet gums are then further processed for making commercial lecithin. The yield of partially degummed oil is 29,400 pounds per hour or 98% yield on a dry basis.

A more complete degumming of crude soybean oil may be achieved by acid degumming as illustrated in the following example, and FIG. 2 of the drawings.

EXAMPLE 2

The feed material is the partially degummed crude soybean oil from Example 1 which contains 200 p.p.m. of phosphorus which corresponds to 0.6% phosphatides, in feed tank 16. It flows into line 17 to pump 18 and then to heater 19 where it is heated to a temperature of 140° F. The pressure at pump 17 is 130 PSIG. Flow control valve 20 is set to regulate the flow rate at 29,400 pounds per hour. Pipe line 21 has a supply of 85% phosphoric acid which is metered with metering pump 22 at a rate of 0.12% or 34.8 pounds per hour. This equals 0.10% on a 100% acid basis. The oil-acid mixture flows from line 23 into mixer 24. This mixer is similar to mixer 8 in FIG. 1 except that it is of stainless steel construction and there is only a 1 minute retention time. The flow is then into line 25 where water supply 26 is regulated by means of flow control valve 27 to supply 3% of water or 882 pounds per hour. The flow is then into mixer 28 which is similar to mixer 8 in Example 1, and then into the centrifuge 29 which is similar to 10 in FIG. 1. The wetted gums flow out of line 32 into tank 34 through the automatic back pressure valve 33. The amount of wet gums is 1,285 pounds per hour containing 70% water, 10% phosphatides and 20% crude soybean oil. It is processed further or otherwise disposed. The degummed oil flows from line 30 to pump 35 through the automatic back pressure valve 31. Pump 35 has an automatic equalizer 36. The pump pressure is 120 PSIG. The flow then is to heater 38 in which the oil is heated to 180° F. Pipe line 39 has hot softened water at 190° F. and the flow is controlled by flow control valve 40 at a rate of 20% or 5,800 pounds per hour. The oil water mixture is then separated in centrifuge 42 which is identical to centrifuge 29. The wash waters flow from line 45 into waste water tank 47 through the automatic back pressure valve 48. The washed oil flows into pipe line 43 to tank 49 through automatic back pressure valve 44. The washed oil yield is 29,014 pounds per hour containing 0.3% moisture and 60 p.p.m. of phosphatides, measured as phosphorus. The dry weight is 28,927 pounds per hour.

EXAMPLE 3

Instead of a continuous system, the partially degummed crude soybean oil from Example 1 may be acid degummed using a batch process.

For such a process, a cone bottom tank equipped with an efficient mechanical sweep-arm agitator is used. It has a closed steam heating coil and a bottom draw off line. The weight pumped into it for processing is 58,800 pounds. The batch is heated to 140° F. and 0.16% or 94 pounds of 85% phosphoric acid is added to it. This is equal to 0.136% of 100% acid. Mixing is done for 30 minutes. Then 3% of warm water or 1.764 pounds of water is added to the mixer, at which time the temperature is raised to 155° F. and mixing is continued for an additional 20 minutes. The agitator is shut off and the mixture is allowed to settle until a definite separation of oil and water phase occurs. This requires about 6 hours. The water-gum phase is carefully drawn off. The agitator is then put on, 20% of hot soft water is sprayed on the batch while the temperature kettle is increased to 170° F. The batch is allowed to settle again for 4 hours. At this time the wash water is drawn off. The washed oil yield is 58,028 pounds containing 0.3% of moisture and 70 p.p.m. of phosphorus which corresponds to 0.21% of phosphatides. The dry weight is 57,854 pounds.

EXAMPLE 4

Figure 3:
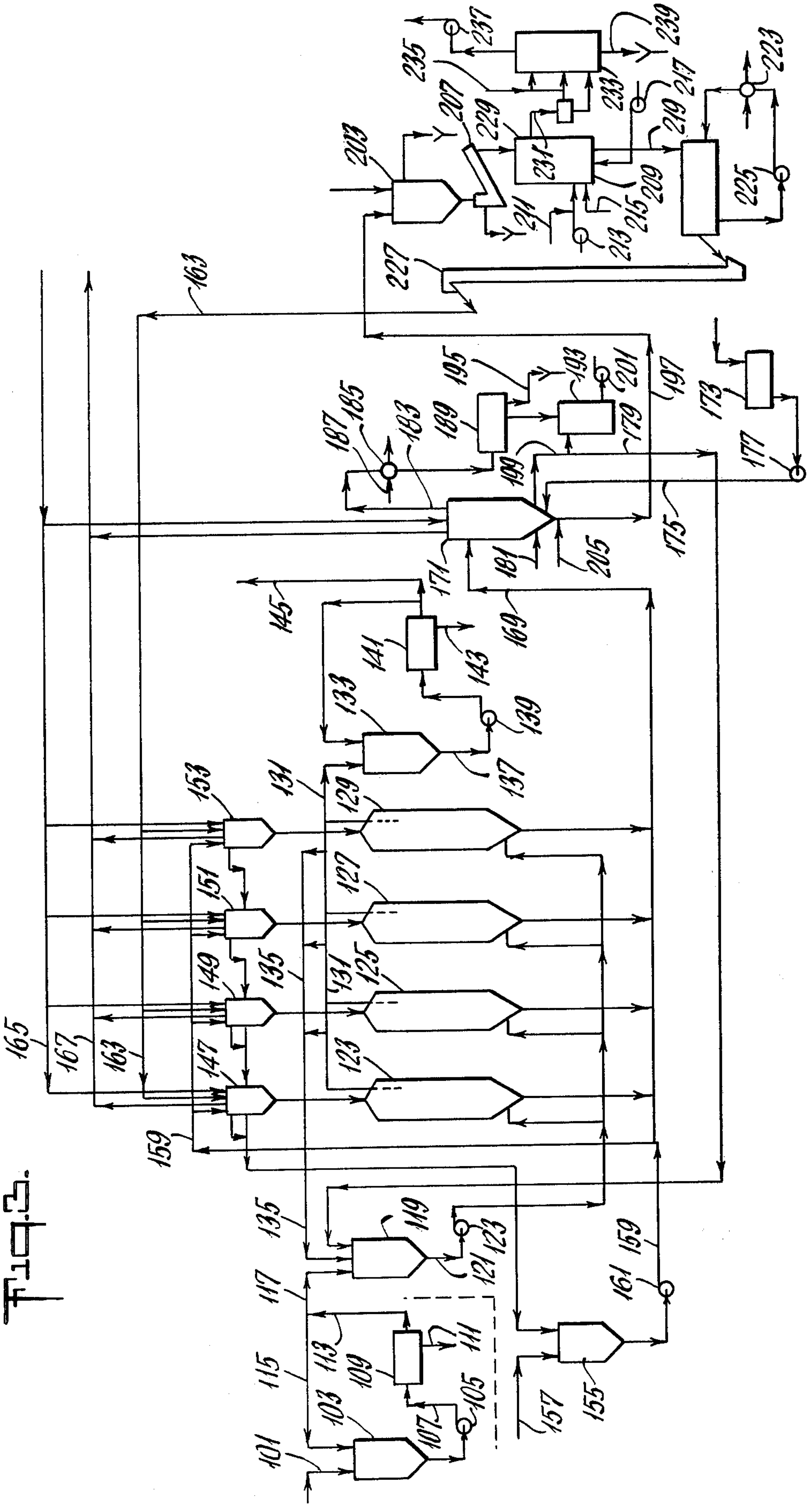
FIG. 3 is a diagrammatic and schematic representation of equipment suitable for carrying out the activated carbon treatment step of the present invention.

The degummed soya oil, treated in accordance with the procedures of any of the preceding examples, is next subjected to the activated carbon treatment step of the present invention. Referring to FIG. 3 of the drawings, degummed soya oil is carried through line 101 to pre-filter feed tank 103 where it is stored until pre-filtration and subsequent processing is carried out. At that time the degummed soya oil is pumped by means of pump 105 through line 107 to pre-filter 109, which may be of any construction suitable for removing suspended particulate matter from the degummed oil. A paper filter may be employed. The sludge of removed suspended particulate matter is eliminated at 111. The pre-filtered oil is next transported through lines 113 and 117 to adsorber feed tank 119, which is insulated. If necessary, the oil may be refiltered by returning it through line 115 to the pre-filter feed tank 103. The oil is now ready for passage through the activated carbon adsorbers and is pumped through line 121 by pump 123 to adsorber columns 123, 125, 127 and 129. While four adsorber colums are depicted in the drawing, the actual number employed will vary according to the volume of oil being processed. The adsorber columns are insulated as well as being heat traced, primarily at the bottom conical portion, for example by small steam lines. After passing upwardly through the activated carbon adsorption columns, the oil is then transported through line 131 to post-filter feed tank 133. If additional activated carbon adsorption treatment is required, the oil may be transported back through line 135 to the adsorber feed tank 119. From the post filter feed tank 133 the oil is pumped through line 137 by pump 139 to a post-filter 141. This filter is similar in construction to the pre-filter 109, and is especially suitable for removing any activated carbon fines which may have become entrained in the oil during passage through the activated carbon adsorber columns. The sludge of removed fines is eliminated at 143. The post-filtered oil is now ready for the final step of steam distillation deodorization and is transported through line 145 to the apparatus for carrying out this step. The adsorber columns are operated as pulse beds and so require continual removal of exhausted or loaded activated carbon for reactivation, and a corresponding continual replenishing of fresh activated carbon for the adsorber column. Fresh activated carbon, either virgin carbon or reactivated carbon, is supplied to each of the adsorber columns through insulated charge tanks 147, 149, 151 and 153. In these charge tanks the activated carbon is mixed with previously refined oil. This refined oil is carried to a refined oil storage tank 155 through line 157 from a location elsewhere in the process stream suitable for providing refined oil. The refined oil is pumped through line 159 to each of the charge tanks by pump 161. Fresh activated carbon is introduced into the charge tanks through line 163. The charge tanks are pressurized by a pressurizing medium supplied through line 165. The pressurizing medium is preferably compressed air, but may be, for example, nitrogen. The charge tanks are vented through line 167.

After the activated carbon is loaded, that is, exhausted by adsorption to practical capacity, it is removed from the adsorber columns through line 169 and carried to the product recovery column 171, which is vented through line 167. The product recovery column is insulated and is pressurized from line 165. A fraction of the oil is transferred under pressure through line 179 to the adsorber feed tank 119. Then the remaining oil is removed from the activated carbon by upflow desorption with hexane supplied from hexane storage tank 173, pumped through line 175 by pump 177. The mixture of oil and hexane is recovered from the product recovery column. This mixture is carried through line 199 to hexane/oil storage tank 193. This hexane/oil mixture may subsequently be removed through pump 201 to an extraction plant or other location where the hexane and oil are, in turn, separated. The hexane is, in turn, removed from the activated carbon by steam stripping. The steam is introduced into the product recovery column 171 through line 181, and the mixture of steam and hexane is carried away from the product recovery column through line 183. The hexane is recovered from the steam and hexane mixture by condensing of the mixture in condenser 185, cooled by water supplied through line 187. The hexane is decanted in decanter 139 and carried through line 191 to hexane/oil storage tank 193. The separated water is sewered through line 195.

The desorbed carbon is now ready for reactivation and is transported through line 197 from product recovery column 171 to desorbed carbon storage tank 203. The desorbed carbon is transported as a slurry, prepared from water supplied through line 205. The slurry is then dewatered in dewatering screw 207, after which the carbon is introduced into reactivation furnace 209. The furnace is fueled by fuel from line 211, with combustion air supplied through fan 213. Steam is also utilized and is supplied through line 215. Air for cooling is supplied to the furnace through pump 217. The by-products of the reactivation are first treated in afterburner 229. They are then removed through line 231 to scrubber 233 supplied with water from line 235 which is then sewered through line 239. Innocuous final products are exhausted to the atmosphere by means of induction fan 237. After reactivation, the carbon is carried through line 219 to cooler 221, which employs water as a cooling medium, with the aid of water cooler 223 and pump 225. After cooling, the reactivated carbon is carried by means of the reactivated carbon transfer elevator 227 and line 163 to the charge tanks 147, 149, 151 and 153.

EXAMPLE 5

The degummed and activated carbon treated soya oil prepared in accordance with the procedures of the preceding Examples is now ready for the final step of steam distillation deodorization under vacuum. The distillation is carried out at approximately 500° F. and at a reduced pressure of approximately 1.5 mm. Hg. The distillation is carried out for approximately four hours while steam is supplied to the oil at the rate of 10 pounds per minute. The recovered oil is of acceptable taste, odor and color, has a phospholipid content, measured as phosphorus, of less than 5.0 p.p.m., and a peroxides concentration level of less than 2.0 meq. per 1.0 kg. of oil.

What we claim is:

1. A process for making a refined edible vegetable oil acceptable in taste, odor and color, storage stable, and having a phospholipid content, measured as phosphorus, of less than 5.0 parts per million, and a peroxides concentration level of less than 2.0 meq. per 1.0 kg. of oil, comprising the steps of:

degumming a crude vegetable oil having a phospholipid level of 0.05% by weight or greater;

passing the degummed vegetable oil through a bed of granular activated carbon whereby the phospholipid content of the vegetable oil, measured as phosphorous, is reduced to less than 5.0 parts per million; and subjecting the treated vegetable oil to steam distillation at reduced pressure.

2. The process of claim 1 wherein the degumming is accomplished by hydration of the crude vegetable oil.

3. The process of claim 1 wherein the degumming is accomplished by hydration and acid treatment of the crude vegetable oil.

4. The process of claim 1 wherein the steam distillation is carried out at a temperature of from about 400° to about 550° F. and at a pressure of from about 1 to about 10 mm. Hg.

5. The process of claim 1 wherein the phospholipid content of the refined vegetable oil final product, measured as phosphorus, is less than 2.0 parts per million.

* * * * *

UNITED STATES PATENT AND TRADEMARK OFFICE

CERTIFICATE OF CORRECTION

PATENT NO. : 4,154,750

DATED : May 15, 1979

INVENTOR(S) : Hal E. Moore and James B. Yeates

It is certified that error appears in the above-identified patent and that said Letters Patent are hereby corrected as shown below:

Column 12, at line 68, "48" should read --46--.

Column 14, at line 51, "139" should read --189--.

Signed and Sealed this

*Sixteenth* Day of *October 1979*

[SEAL]

*Attest:*

RUTH C. MASON
*Attesting Officer*

LUTRELLE F. PARKER
*Acting Commissioner of Patents and Trademarks*